(12) United States Patent
Sugiura et al.

(10) Patent No.: US 8,012,639 B2
(45) Date of Patent: Sep. 6, 2011

(54) FUEL CELL STACK

(75) Inventors: Seiji Sugiura, Utsunomiya (JP); Minoru Koshinuma, Utsunomiya (JP); Jun Kondo, Utsunomiya (JP); Hiroshi Morikawa, Shioya-gun (JP); Masahiro Mohri, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1000 days.

(21) Appl. No.: 11/281,720

(22) Filed: Nov. 16, 2005

(65) Prior Publication Data

US 2006/0110642 A1 May 25, 2006

(30) Foreign Application Priority Data

Nov. 25, 2004 (JP) ................. 2004-339706

(51) Int. Cl.
  *H01M 8/04* (2006.01)
  *H01M 8/24* (2006.01)
(52) U.S. Cl. ......... 429/434; 429/437; 429/456; 429/457
(58) Field of Classification Search .................. None
  See application file for complete search history.

(56) References Cited

U.S. PATENT DOCUMENTS

| 2002/0051900 A1* | 5/2002 | Okamoto et al. | 429/24 |
| 2004/0106028 A1* | 6/2004 | Sugiura et al. | 429/26 |
| 2006/0263663 A1* | 11/2006 | Fowler et al. | 429/34 |

FOREIGN PATENT DOCUMENTS

| JP | 58-142769 | | 8/1983 |
| JP | 63-248073 | * | 10/1988 |
| JP | 08-111231 | | 4/1996 |
| JP | 08-130028 | | 5/1996 |
| JP | 09-161821 | | 6/1997 |
| JP | 2003-346830 | | 12/2003 |
| WO | WO 2004/086546 | * | 10/2004 |

OTHER PUBLICATIONS

Certified translation of JP 63-248073, Oct. 1988.*
Office action from corresponding Japanese Patent Application No. 2004-339706, dated Jun. 16, 2009 (including partial translation thereof).
Japanese Office action dated Apr. 6, 2010 mailed in Japanese Patent Application No. 2004-339706.

* cited by examiner

*Primary Examiner* — Jonathan Crepeau
(74) *Attorney, Agent, or Firm* — Fish & Richardson P.C.

(57) ABSTRACT

A fuel cell stack includes a stack body formed by stacking a plurality of power generation cells in a stacking direction. At opposite ends of the stack body in the stacking direction, end power generation cells are provided. An end coolant flow field is formed on a separator of the end power generation cell. The flow rate of the coolant in the end coolant flow field is smaller than the flow rate of the coolant in a coolant flow field in each of the power generation cells. Specifically, the number of flow grooves of the end coolant flow field is smaller than the number of flow grooves of the coolant flow field.

6 Claims, 10 Drawing Sheets

FUEL CELL STACK

BACKGROUND OF THE INVENTION

1. Field of the Invention

The present invention relates to a fuel cell stack comprising a stack body formed by stacking a plurality of power generation cells in a stacking direction. Each of the power generation cells includes an electrolyte electrode assembly and separators sandwiching the electrolyte electrode assembly. The electrolyte electrode assembly includes a pair of electrodes, and an electrolyte interposed between the electrodes. A coolant flow field is formed at least at one of positions between the power generation cells for allowing a coolant to flow in a direction along a power generation surface.

2. Description of the Related Art

For example, a polymer electrolyte fuel cell employs a membrane electrode assembly which includes an anode, a cathode, and an electrolyte membrane (electrolyte) interposed between the anode and the cathode. The electrolyte membrane is a solid polymer ion exchange membrane. The membrane electrode assembly and separators sandwiching the membrane electrode assembly make up a unit of a power generation cell for generating electricity. In general, a predetermined number of a plurality of power generation cells are stacked together in a stacking direction. At opposite ends of the power generation cells in the stacking direction, terminal plates are provided. Insulating plates are provided outside the terminal plates, and end plates are provided outside the insulating plates to form a fuel cell stack.

In the fuel cell, a fuel gas such as a gas chiefly containing hydrogen (hereinafter also referred to as the "hydrogen-containing gas") is supplied to the anode. A gas chiefly containing oxygen or air (hereinafter also referred to as the "oxygen-containing gas") is supplied to the cathode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electrical energy.

In some of power generation cells of the fuel cell stack, in comparison with the other power generation cells, the temperature is decreased easily due to heat radiation to the outside. For example, in the power generation cells provided at ends of the fuel cell stack in the stacking direction (hereinafter also referred to as the "end power generation cells"), since the heat is radiated to the outside from the terminal plates (current collecting plates) for collecting electrical charges generated in each of the power generation cells as electricity, or from the end plates for tightening the stacked power generation cells, the decrease in the temperature is significant.

Therefore, due to the decrease in the temperature, in the end power generation cells, in comparison with power generation cells in the central position of the fuel cell stack, water condensation occurs easily, and the water produced in the power generation cannot be discharged smoothly. In particular, when operation of the fuel cell stack is started below the freezing temperature, the water produced in the power generation by the end power generation cells may freeze undesirably. Thus, it is not possible to effectively raise the temperature in the end power generation cell. Consequently, the voltage of the fuel cell stack is low.

In an attempt to address the problem, Japanese Laid-Open Patent Publication No. 8-130028 discloses a polymer electrolyte fuel cell as shown in FIG. 10. The polymer electrolyte fuel cell includes an end power generation cell 1. The end power generation cell 1 includes a membrane electrode assembly 2 and separators 3 and 4 sandwiching the membrane electrode assembly 2. The membrane electrode assembly 2 includes a fuel electrode (anode) 2b, an air electrode (cathode) 2c, and a polymer electrolyte membrane 2a interposed between the fuel electrode 2b and the air electrode 2c. The separator 3 has fuel gas grooves 3a on a surface facing the fuel electrode 2b, and has coolant grooves 3b on the opposite surface.

The separator 4 of the end power generation cell 1 has oxygen-containing gas grooves 4a on a surface facing the air electrode 2c. No coolant grooves are formed on the opposite surface of the separator 4. According to the disclosure of Japanese Laid-Open Patent Publication No. 8-130028, in the structure, the separator 4 is not cooled excessively by the coolant. That is, the end power generation cell 1 is not cooled excessively.

However, in the conventional technique, since the coolant does not flow outside the end power generation cell 1, the end power generation cell 1 may not be cooled sufficiently. Though not shown, a terminal plate, an insulating plate, and an end plate (tightening plate) are stacked on the end power generation cell 1. Since the insulating plate is made of resin and heat conductivity of the insulating plate is low, heat radiation amount is limited. Therefore, in comparison with the power generation cells at the central position, the end power generation cell 1 has a considerably high temperature. Components such as the polymer electrolyte membrane 2a are degraded easily, and the durability of the end power generation cell 1 is poor.

SUMMARY OF THE INVENTION

A main object of the present invention is to provide a fuel cell stack having simple and economical structure in which the temperature of end power generation cells are kept equal to the temperature of power generation cells, and improvement in the power generation performance and durability is achieved.

The present invention relates to a fuel cell stack comprising a stack body formed by stacking a plurality of power generation cells in a stacking direction. Each of the power generation cells includes an electrolyte electrode assembly and separators sandwiching the electrolyte electrode assembly. The electrolyte electrode assembly includes a pair of electrodes, and an electrolyte interposed between the electrodes. A coolant flow field is formed at least at one of positions between the power generation cells for allowing a coolant to flow in a direction along a power generation surface.

The fuel cell stack has an end power generation cell provided at least at one end of the stack body in the stacking direction. An end coolant flow field is formed on the outside of the end power generation cell for allowing the coolant to flow in the direction along the power generation surface. The end coolant flow field is configured such that the flow rate of the coolant in the end coolant flow field is smaller than the flow rate of the coolant in the coolant flow field.

Further, it is preferable that the number of flow grooves of the end coolant flow field is smaller than the number of flow grooves of the coolant flow field.

Further, it is preferable that the number of flow grooves of an end channel for supplying the coolant to, or discharging the coolant from the end coolant flow field is smaller than the number of flow grooves of a channel for supplying the coolant to, or discharging the coolant from the coolant flow field.

Further, it is preferable that the depth of flow grooves of the end coolant flow field is smaller than the depth of flow grooves of the coolant flow field.

Further, it is preferable that the depth of flow grooves of an end channel for supplying the coolant to, or discharging the coolant from the end coolant flow field is smaller than the depth of flow grooves of a channel for supplying the coolant to, or discharging the coolant from the coolant flow field.

According to the present invention, the flow rate of the coolant in the end coolant flow field formed on the outside of the end power generation cell is smaller than the flow rate of the coolant in the coolant low field. Therefore, the end power generation cell is not cooled excessively. Further, it is possible to prevent the temperature of the end power generation cell from increasing to become higher than the temperature of the power generation cells at the central position.

Simply by determining the number or the depth of the flow grooves of the end coolant flow field, or the number or the depth of the flow grooves of the end channel, the flow rate of the coolant flowing through the end coolant flow field relative to the flow rate of the coolant flowing through the coolant flow field is adjusted. Therefore, the structure of the fuel cell stack is simplified. Further, it is possible to freely determine the flow rate of the coolant in the end coolant flow field.

Accordingly, with the simple and economical structure, the temperature of the end power generation cell is kept equal to the temperature of the power generation cell. Further, improvement in the power generation performance and durability of the end power generation cell is achieved. Further, at the time of starting operation of the fuel cell stack at a low temperature, it is possible to suppress the degradation of the power generation performance due to the delay in raising the temperature of the end power generation cell.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
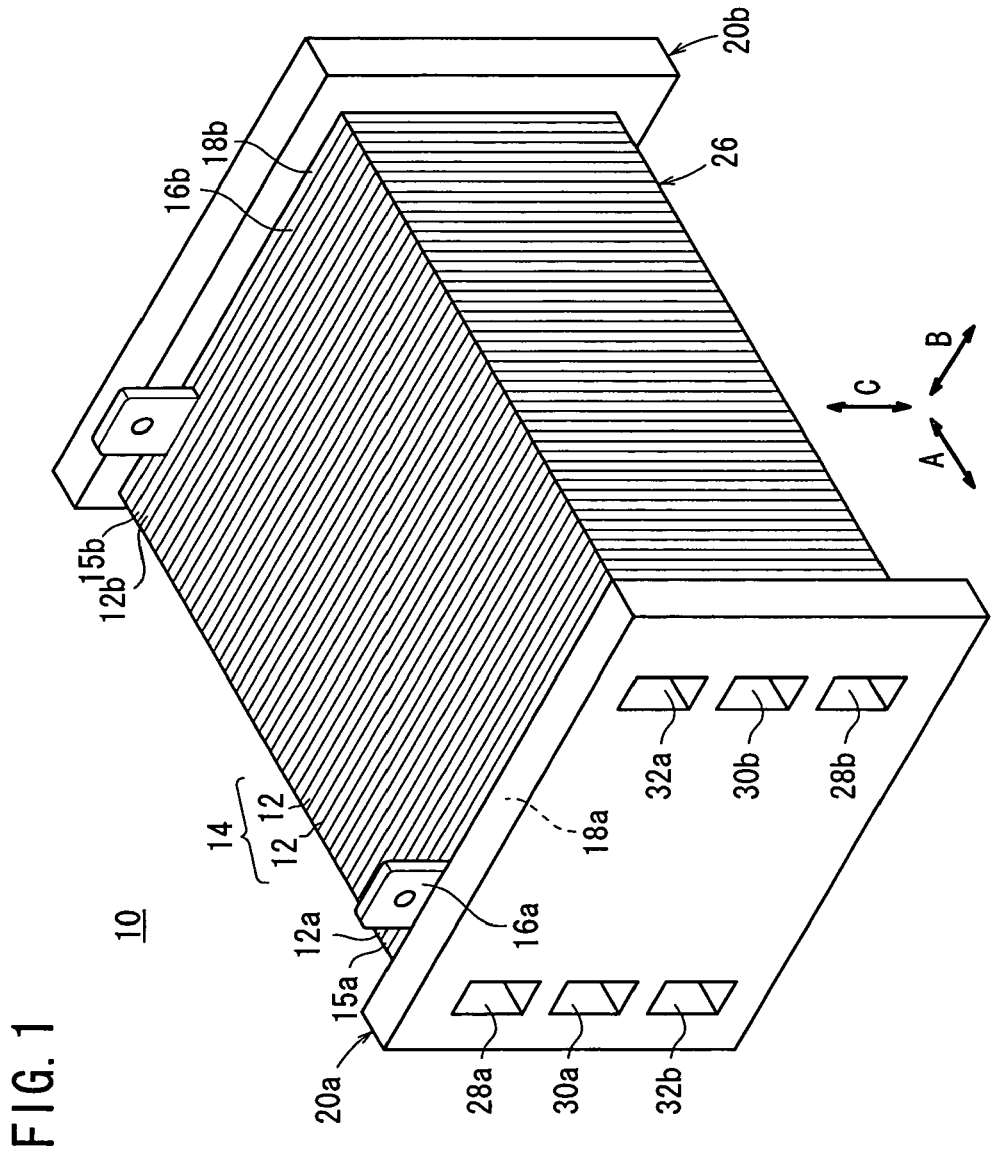
FIG. 1 is a perspective view showing a fuel cell stack according to a first embodiment of the present invention.

FIG. 1 is a perspective view showing a fuel cell stack 10 according to a first embodiment of the present invention. The fuel cell stack 10 includes a stack body 14 formed by stacking a plurality of power generation cells 12 in a stacking direction indicated by an arrow A. At opposite ends of the stack body 14 in the stacking direction, end power generation cells 12a, 12b are provided. End separators 15a, 15b are provided outside the end power generation cells 12a, 12b. Terminal plates 16a, 16b are provided outside the end separators 15a, 15b. Insulating plates 18a, 18b are provided outside the terminal plates 16a, 16b. Further, end plates 20a, 20b are provided outside the insulating plates 18a, 18b. The components between the end plates 20a, 20b are tightened together by tightening bolts (not shown). For example, the fuel cell stack 10 is mounted on a vehicle such as an automobile.

Figure 2:
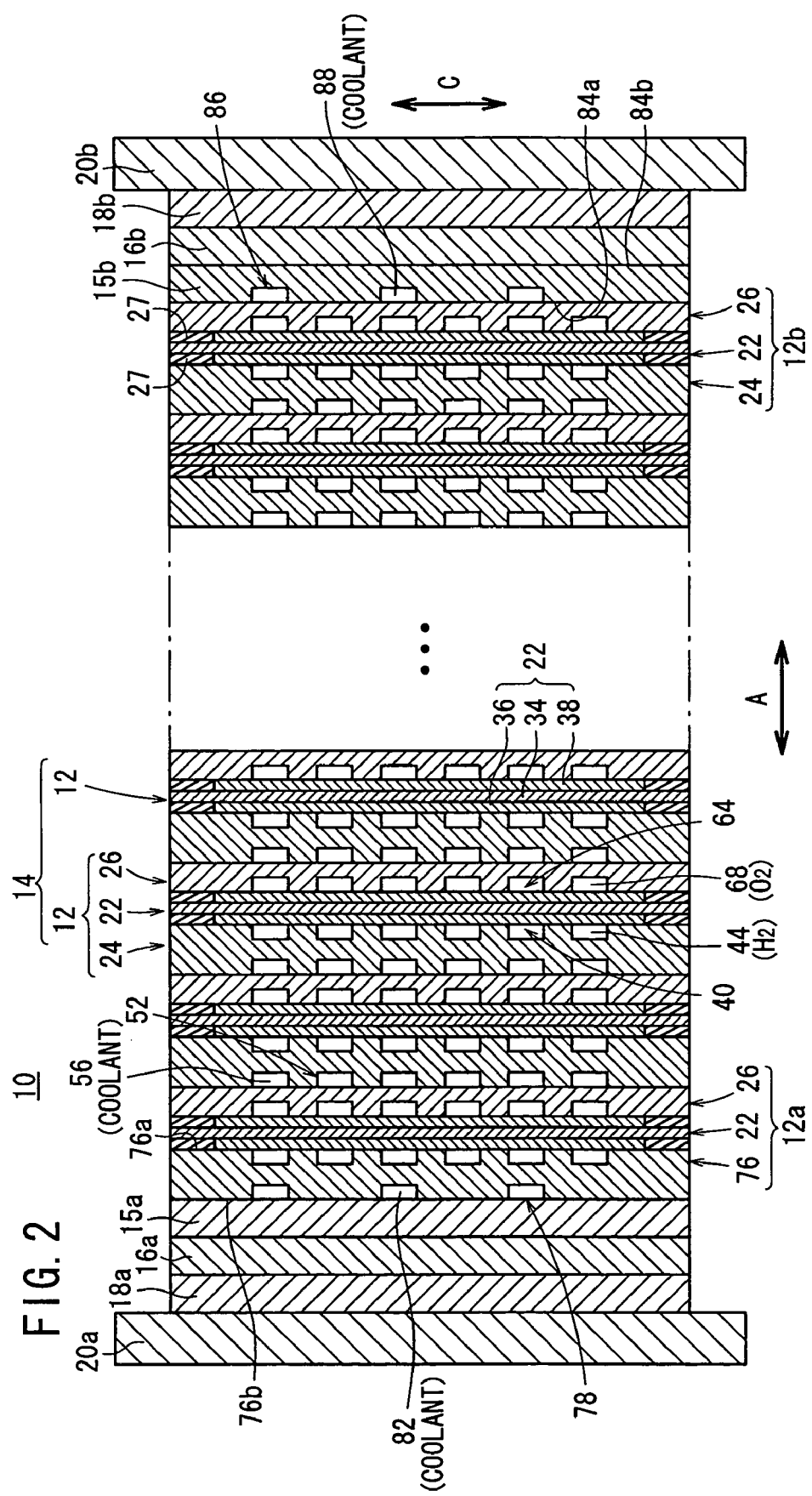
FIG. 2 is a partial cross sectional view showing the fuel cell stack.
Figure 3:
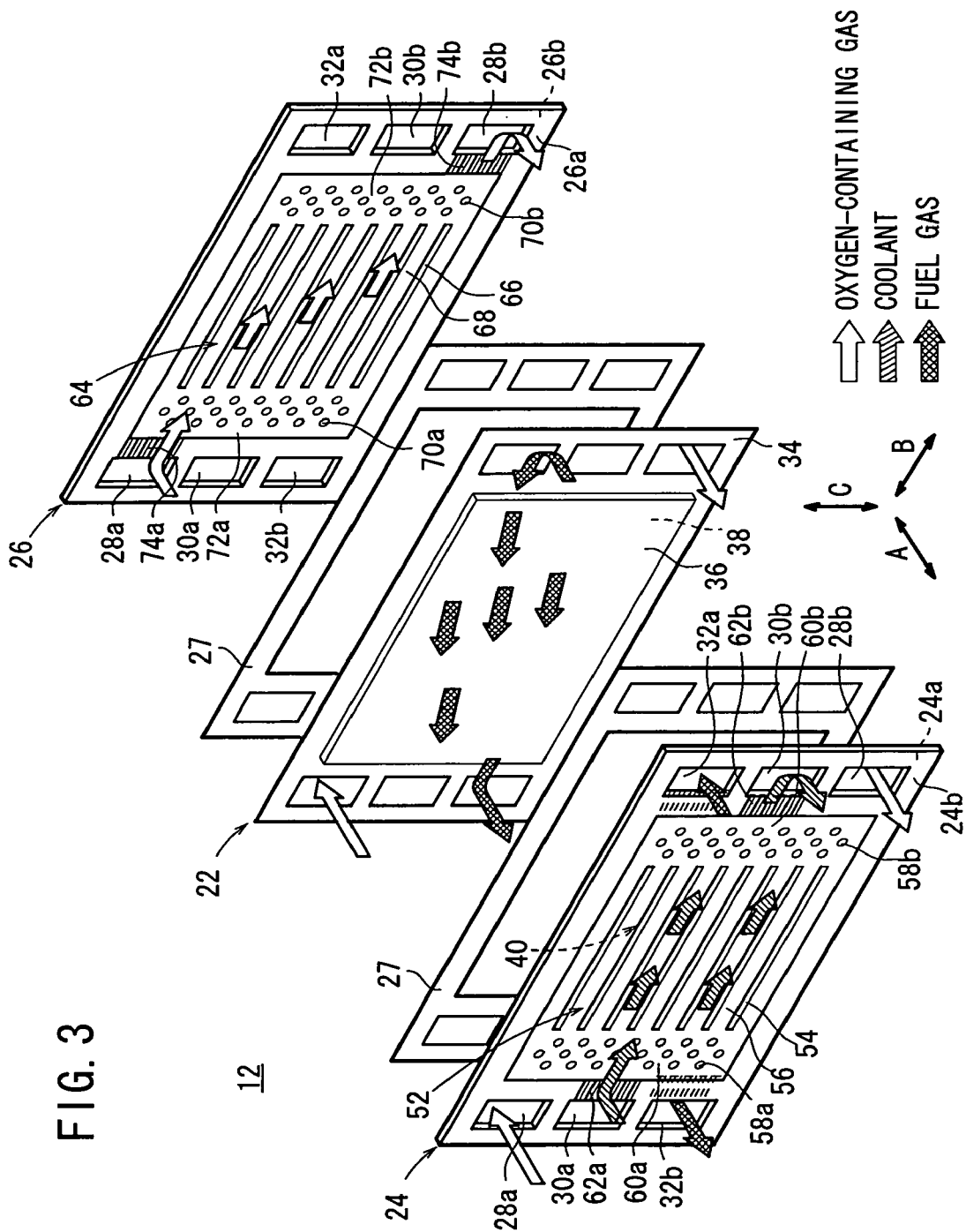
FIG. 3 is an exploded perspective view showing a power generation cell of the fuel cell stack.

As shown in FIGS. 2 and 3, each of the power generation cells 12 includes a membrane electrode assembly (electrolyte electrode assembly) 22 and first and second separators 24, 26 sandwiching the membrane electrode assembly 22. The first and second separators 24, 26 are, for example, carbon separators. Alternatively, metal separators may be used as the first and second separators 24, 26. Gaskets 27 are provided as seal members at each of positions between the first and second separators 24, 26 and the membrane electrode assembly 22.

As shown in FIG. 3, at one end of the power generation cell 12 in a direction indicated by an arrow B, an oxygen-containing gas supply passage 28a for supplying an oxygen-containing gas such as air, a coolant supply passage 30a for supplying a coolant such as pure water or ethylene glycol or the like, and a fuel gas discharge passage 32b for discharging a fuel gas such as a hydrogen-containing gas are provided. The oxygen-containing gas supply passage 28a, the coolant supply passage 30a, and the fuel gas discharge passage 32b extend through the power generation cell 12 in the direction indicated by the arrow A.

At the other end of the power generation cell 12 in the direction indicated by the arrow B, a fuel gas supply passage 32a for supplying the fuel gas, a coolant discharge passage 30b for discharging the coolant, and an oxygen-containing gas discharge passage 28b for discharging the oxygen-containing gas are provided. The fuel gas supply passage 32a, the coolant discharge passage 30b, and the oxygen-containing gas discharge passage 28b extend through the power generation cell 12 in the direction indicated by the arrow A.

The membrane electrode assembly 22 includes an anode 36, a cathode 38, and a solid polymer electrolyte membrane 34 interposed between the anode 36 and the cathode 38. The solid polymer electrolyte membrane 34 is formed by impregnating a thin membrane of perfluorosulfonic acid with water, for example.

Each of the anode 36 and the cathode 38 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 36 and the electrode catalyst layer of the cathode 38 are fixed to both surfaces of the solid polymer electrolyte membrane 34, respectively.

Figure 4:
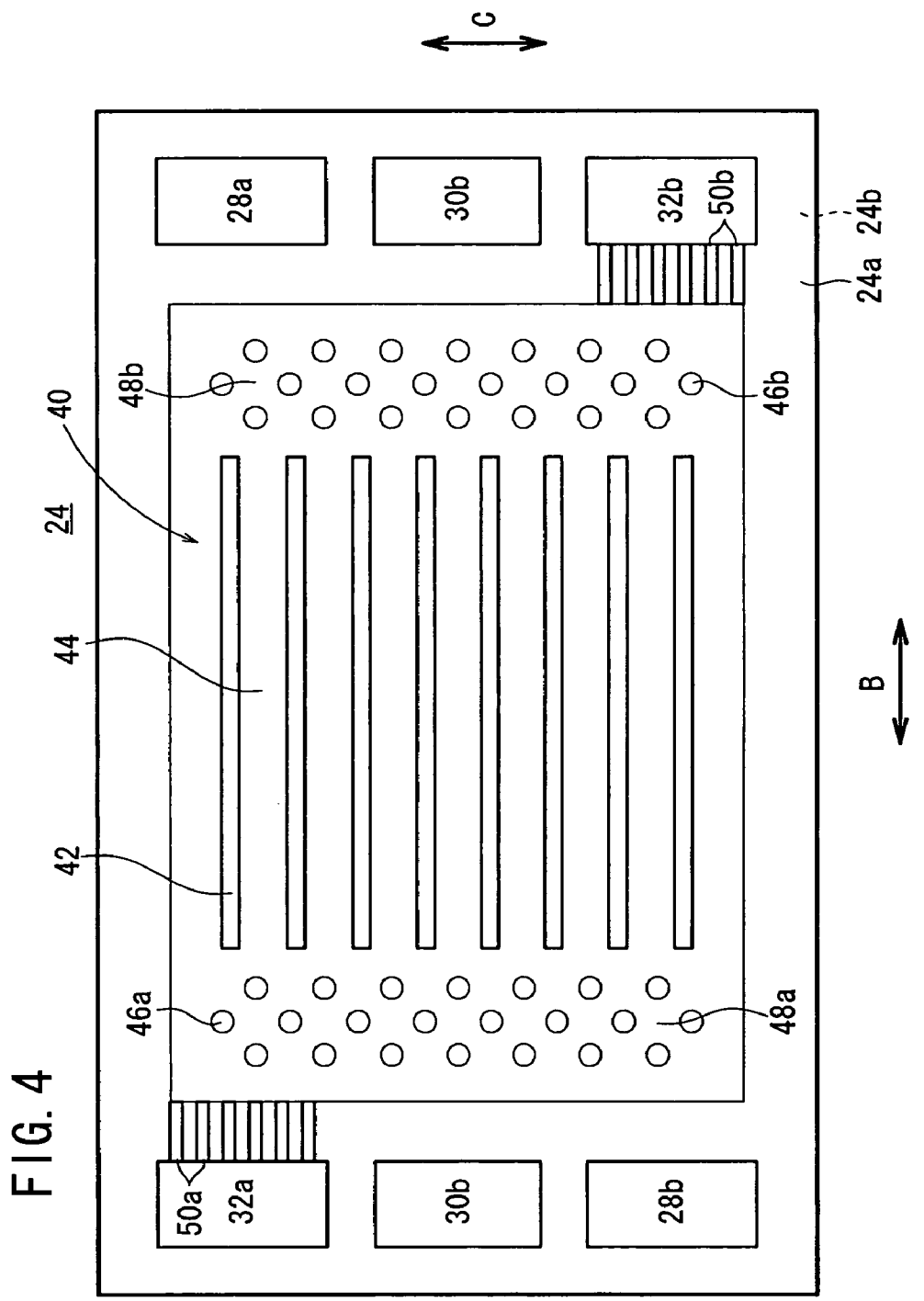
FIG. 4 is a front view showing a first metal separator of the power generation cell.

The first separator 24 has a fuel gas flow field 40 on its surface 24a facing the membrane electrode assembly 22. As shown in FIG. 4, the fuel gas flow field 40 includes a plurality of flow grooves 44 formed between a plurality of narrow straight protrusions 42. The narrow straight protrusions 42 extend in the direction indicated by the arrow B, and are arranged in parallel in the direction indicated by the arrow C.

At opposite ends of the narrow straight protrusions 42 in the direction indicated by the arrow B, an inlet buffer 48a and an outlet buffer 48b are provided. A plurality of bosses 46a are formed in the inlet buffer 48a, and a plurality of bosses 46b are formed in the outlet buffer 48b. The inlet buffer 48a is connected to the fuel gas supply passage 32a through an inlet channel 50a comprising a plurality of grooves, and the outlet buffer 48b is connected to the fuel gas discharge passage 32b through an outlet channel 50b comprising a plurality of grooves.

As shown in FIG. 3, a coolant flow field 52 is formed on a surface 24b of the first separator 24. The coolant flow field 52 includes a plurality of flow grooves 56 formed between a plurality of narrow straight protrusions 54. The narrow straight protrusions 54 extend in the direction indicated by the arrow B, and are arranged in parallel in the direction indicated by the arrow C. At opposite ends of the narrow straight protrusions 54 indicated by the arrow B, an inlet buffer 60a and an outlet buffer 60b are provided. A plurality of bosses 58a are formed in the inlet buffer 60a, and a plurality of bosses 58b are formed in the outlet buffer 60b. The inlet buffer 60a is connected to the coolant supply passage 30a through an inlet channel 62a comprising a plurality of grooves, and the outlet buffer 60b is connected to the coolant discharge passage 30b through an outlet channel 62b comprising a plurality of grooves.

The second separator 26 has an oxygen-containing gas flow field 64 on its surface 26a facing the membrane electrode assembly 22. The oxygen-containing gas flow field 64 includes a plurality of flow grooves 68 formed between a plurality of narrow straight protrusions 66. The narrow straight protrusions 66 extend in the direction indicated by the arrow B, and are arranged in parallel in the direction indicated by the arrow C. At opposite ends of the narrow straight protrusions 66 in the direction indicated by the arrow B, an inlet buffer 72a and an outlet buffer 72b are provided. A plurality of bosses 70a are formed in the inlet buffer 72a, and a plurality of bosses 70b are formed in the outlet buffer 72b.

The inlet buffer 72a is connected to the oxygen-containing gas supply passage 28a through an inlet channel 74a comprising a plurality of grooves, and the outlet buffer 72b is connected to the oxygen-containing gas discharge passage 28b through an outlet channel 74b comprising a plurality of grooves. A surface 26b of the second separator 26 is flat.

As shown in FIG. 2, the end power generation cell 12a includes first and second separators 76, 26 sandwiching the membrane electrode assembly 22. The constituent elements of the end power generation cell 12a that are identical to those of the power generation cell 12 are labeled with the same reference numeral, and detailed description thereof will be omitted. Further, the constituent elements of the end power generation cell 12b that are identical to those of the power generation cell 12 are labeled with the same reference numeral, and detailed description thereof will be omitted.

Figure 5:
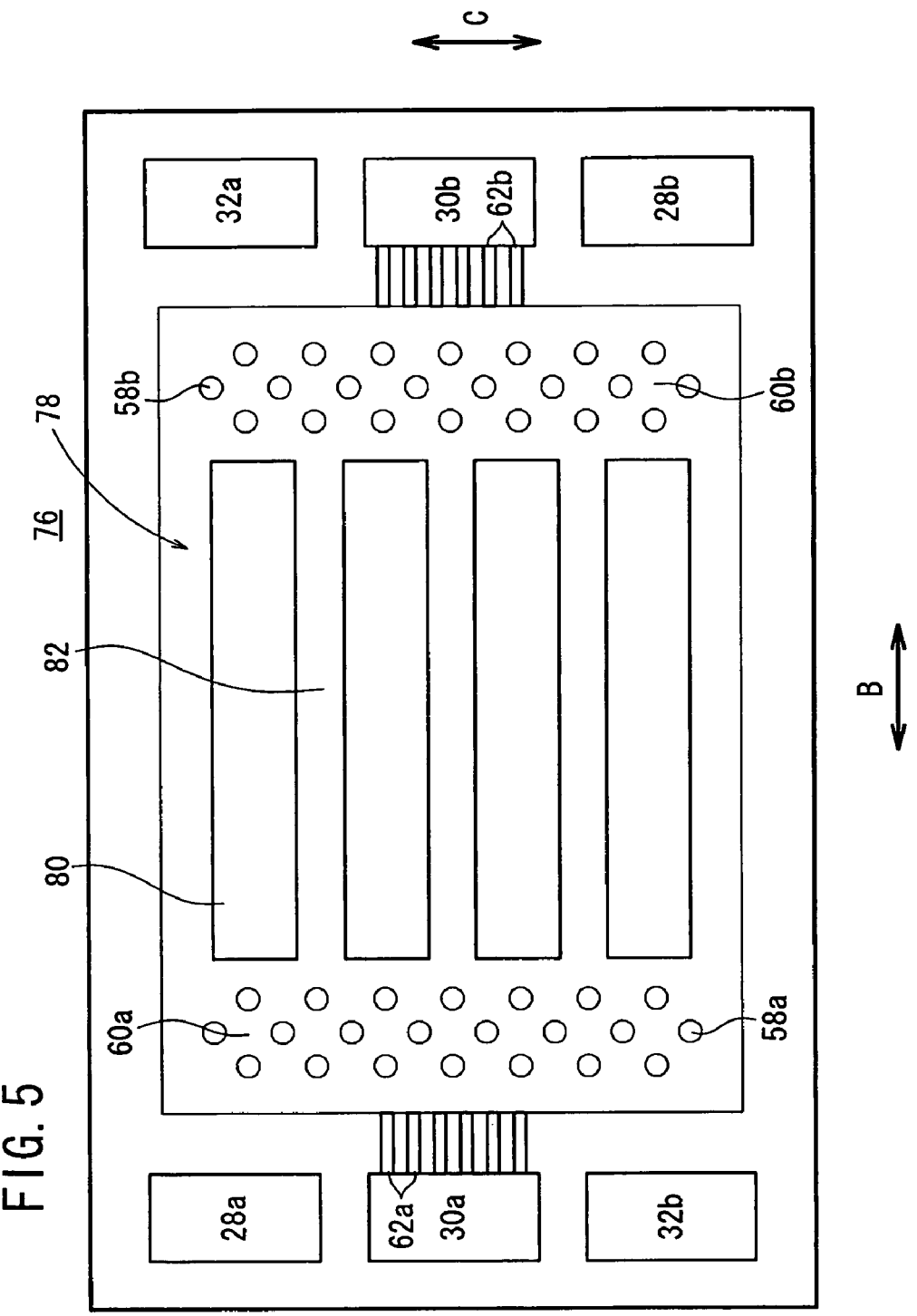
FIG. 5 is a view showing an end coolant flow field provided at an end power generation cell of the fuel cell stack.

The first separator 76 has the fuel gas flow field 40 on its surface 76a facing the membrane electrode assembly 22. Further, an end coolant flow field 78 is formed on a surface 76b of the first separator 76. As shown in FIG. 5, the flow rate of the coolant in the end coolant flow field 78 is smaller than the flow rate of the coolant in the coolant flow field 52 formed in each of the power generation cells 12. Specifically, the end coolant flow field 78 includes a plurality of flow grooves 82 formed between a plurality of wide protrusions 80. Each of the wide protrusions 80 has a large dimension in the direction indicated by the arrow C. The number of the flow grooves 82 is smaller than the number of the flow grooves 56 of the coolant flow field 52.

As shown in FIG. 2, the end separator 15b provided on the outside of the end power generation cell 12b has an end coolant flow field 86 on its surface 84a facing the end power generation cell 12b. As with the end coolant flow field 78, the end coolant flow field 86 includes a plurality of flow grooves 88, and the number of the flow grooves 88 is smaller than the number of the flow grooves 56 of the coolant flow field 52. The end separator 15b has a flat surface 84b which contacts the terminal plate 16b.

Operation of the fuel cell stack 10 will be described below.

Firstly, in FIG. 1, an oxygen-containing gas is supplied to the oxygen-containing gas supply passage 28a of the fuel cell stack 10, and a fuel gas is supplied to the fuel gas supply passage 32a of the fuel cell stack 10. Further, a coolant is supplied to the coolant supply passage 30a of the fuel cell stack 10.

In the fuel cell stack 10, as shown in FIG. 3, the oxygen-containing gas flows from the oxygen-containing gas supply passage 28a into the oxygen-containing gas flow field 64 of the second separator 26 through the inlet channel 74a. The oxygen-containing gas flows along the cathode 38 of the membrane electrode assembly 22 for inducing an electrochemical reaction at the cathode 38. As shown in FIG. 4, the fuel gas flows from the fuel gas supply passage 32a into the fuel gas flow field 40 of the first separator 24 through the inlet channel 50a. The fuel gas flows along the anode 36 of the membrane electrode assembly 22 for inducing an electrochemical reaction at the anode 36.

Thus, in each of the membrane electrode assemblies 22, the oxygen-containing gas supplied to the cathode 38, and the fuel gas supplied to the anode 36 are consumed in the electrochemical reactions at catalyst layers of the cathode 38 and the anode 36 for generating electricity.

Then, the oxygen-containing gas consumed at the cathode 38 flows through the outlet channel 74b into the oxygen-containing gas discharge passage 28b, and is discharged to the end plate 20a. Likewise, the fuel gas consumed at the anode 36 flows through the outlet channel 50b into the fuel gas discharge passage 32b, and is discharged to the end plate 20a.

As shown in FIG. 3, the coolant such as pure water or ethylene glycol or the like, flows through the inlet channel 62a into the coolant flow field 52 between the first and second separators 24, 26, and flows in the direction indicated by the arrow B. After the coolant cools the membrane electrode assembly 22, the coolant flows through the outlet channel 62b into the coolant discharge passage 30b, and is discharged to the end plate 20a. The coolant is circulated, and supplied again to the fuel cell stack 10.

In the first embodiment, as shown in FIG. 2, the end power generation cells 12a, 12b are provided at opposite ends of the stack body 14 in the stacking direction. The end coolant flow fields 78, 86 are formed on the outside of the end power generation cells 12a, 12b for allowing the coolant to flow along the power generation surfaces. The number of the flow grooves 82 of the end coolant flow field 78, and the number of the flow grooves 88 of the end coolant flow field 86 are smaller than the number of flow grooves 56 of the coolant flow field 52 in each of the power generation cells 12.

Therefore, the flow rate of the coolant in each of the end coolant flow fields 78, 86 is smaller than the flow rate of the coolant in the coolant flow field 52. Thus, it is possible to prevent the end power generation cells 12a, 12b from being cooled excessively, and the temperatures of the power generation cells 12a, 12b do not become higher than the temperature of the power generation cells 12 at the central position of the fuel cell stack 10.

The embodiment can be carried out simply by designing the structure in which the number of the flow grooves 82 of the end coolant flow field 78 and the number of the flow grooves 88 of the end coolant flow field 86 are smaller than the number of the flow grooves 56 of the coolant flow field 52. Therefore, with the simple structure, it is possible to freely determine the flow rate of the coolant in the end coolant flow field 78 and the flow rate of the coolant in the end coolant flow field 86.

Thus, in the first embodiment, with the simple and economical structure, the temperatures of the end power generation cells 12a, 12b are kept equal to the temperature of the power generation cells 12 at the central position, and improvement in the power generation performance and durability of the end power generation cells 12a, 12b is achieved. Further, at the time of starting operation of the fuel cell stack 10 at a low temperature, it is possible to suppress the degradation of the power generation performance due to the delay in raising the temperatures of the end power generation cells 12a, 12b.

As an experiment, the temperature distribution in the power generation cell depending on the position in the stacking direction was detected in the case of the first embodiment, in the case of a first conventional example in which the coolant is supplied to each of the end power generation cells 12a, 12b, and the power generation cells 12 at the same flow rate, and in the case of a second conventional example in which no coolant is supplied to the end power generation cells 12a, 12b.

Figure 6:
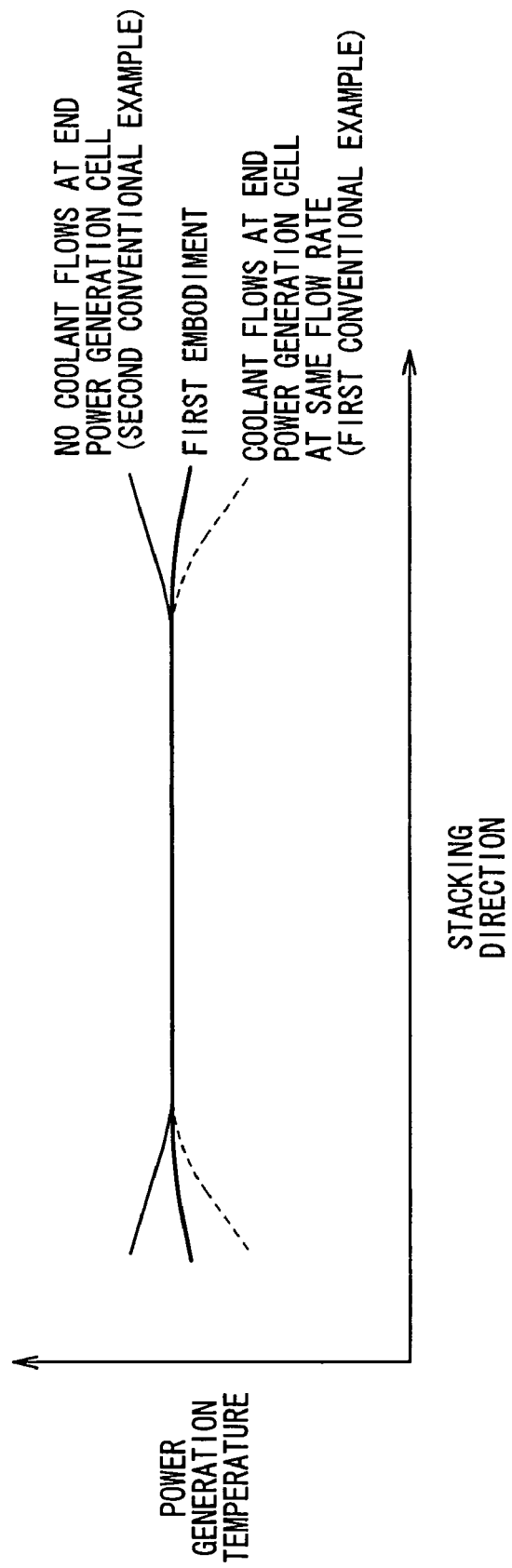
FIG. 6 is a view showing the change in the temperature of the power generation cell depending on the position in the stacking direction in each of the first embodiment, a first conventional example, and a second conventional example.

Results are shown in FIG. 6. In the temperature distribution of the first embodiment, the temperature is substantially the same from the opposite ends in the stacking direction to the central position. In contrast, in the first and second conventional examples, the temperatures of the end power generation cells 12a, 12b are significantly different from the temperature of the power generation cells at the central position.

Figure 7:
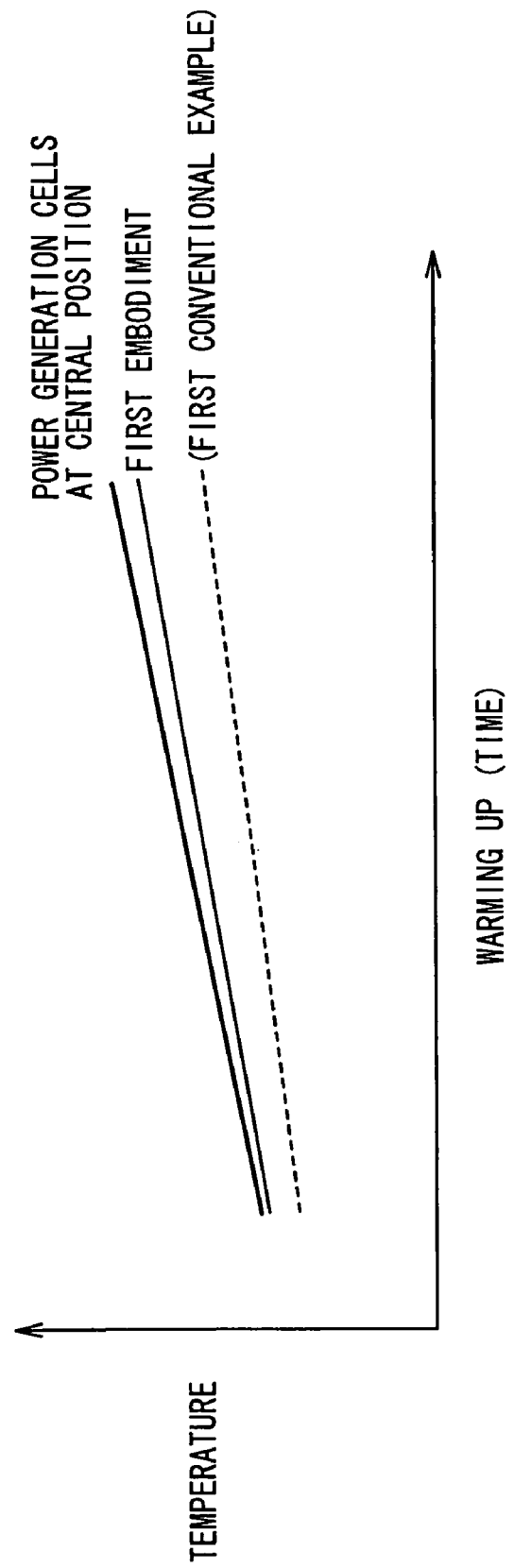
FIG. 7 is a view showing the change in the temperature of the end power generation cell in the first embodiment, the end power generation cell in the first conventional example, and the power generation cells at the central position, depending on the time for warming up to start operation of the fuel cell stack.

The change in the temperature was detected in each of the end power generation cell in the first embodiment, the end power generation cell in the first conventional example, and the power generation cells at the central position, depending on the time for warming up to start operation of the fuel cell stack 10. Results are shown in FIG. 7. As shown in FIG. 7, the temperature of the end power generation cells 12a or 12b was low, and it took a considerable time for warming up to start operation of the fuel cell stack 10 in the case of the first conventional example in which the coolant is supplied to each of the end power generation cells 12a, 12b, and the power generation cells 12 at the same flow rate. On the other hand, the temperature of the end power generation cell 12a or 12b is substantially the same as the temperature of the power generation cells 12, and warming up to start operation of the fuel cell stack 10 was carried out rapidly in the first embodiment.

Figure 8:
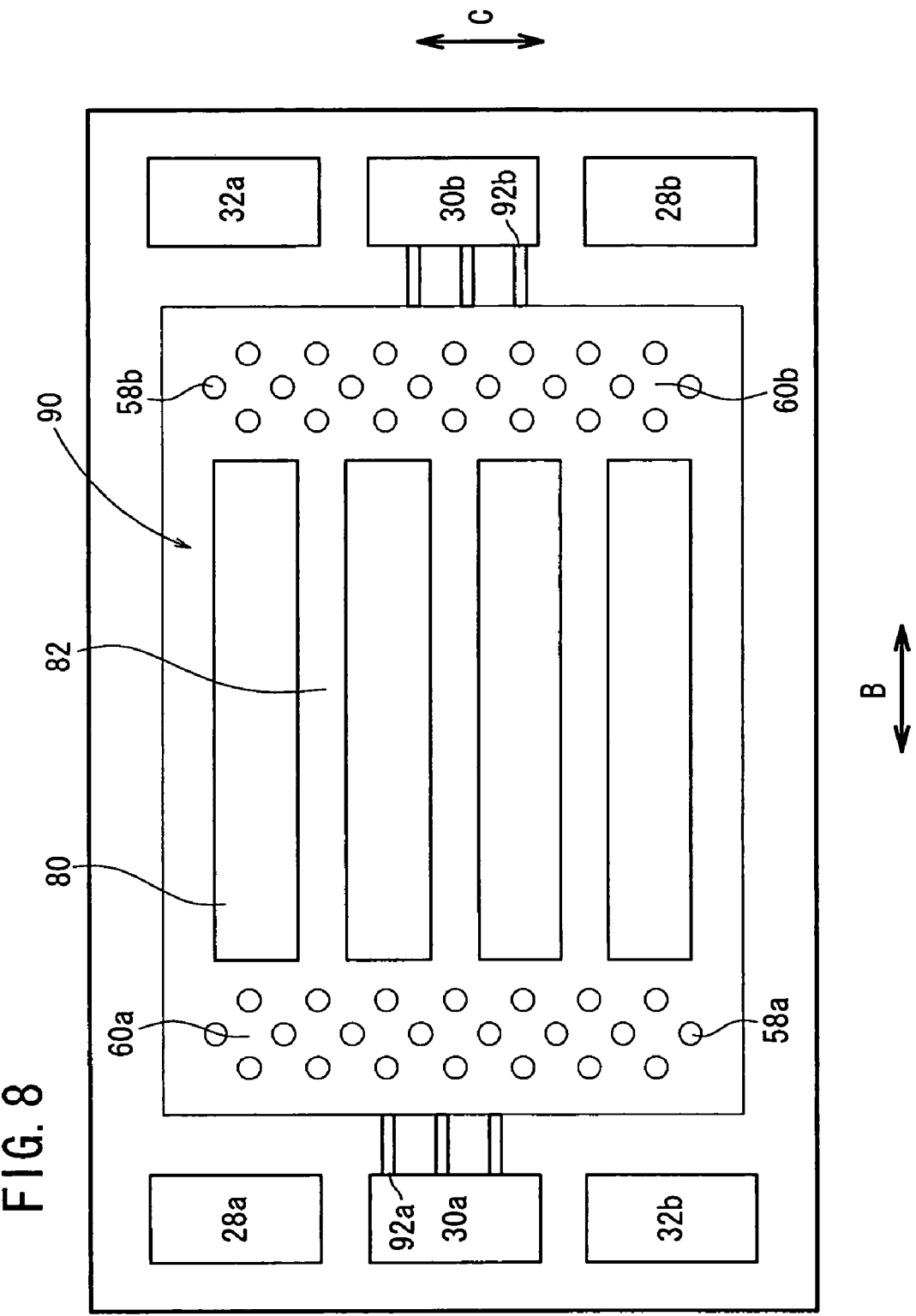
FIG. 8 is a view showing an end coolant flow field of a fuel cell stack according to a second embodiment of the present invention.

FIG. 8 is a view showing an end coolant flow field 90 of a fuel cell stack according to a second embodiment of the present invention. The constituent elements of the end coolant flow field 90 that are identical to those of the end coolant flow field 78 used in the first embodiment are labeled with the same reference numeral, and detailed description thereof will be omitted.

The end coolant flow field 90 has an inlet channel 92a connecting the coolant supply passage 30a and the inlet buffer 60a, and an outlet channel 92b connecting the coolant discharge passage 30b and the outlet buffer 60b. The number of grooves of the inlet channel 92a is smaller than the number of grooves of the inlet channel 62a. The number of grooves of the outlet channel 92b is smaller than the number of grooves of the outlet channel 62b.

In the second embodiment, the number of grooves of the inlet channel 92a is smaller than the number of grooves of the inlet channel 62a, and the number of grooves of the outlet channel 92b is smaller than the number of grooves of the outlet channel 62b. Therefore, the flow rate of the coolant supplied from the coolant supply passage 30a into the end coolant flow field 90 is smaller than the flow rate of the coolant supplied from the coolant supply passage 30a into the coolant flow field 52 in each of the power generation cells 12.

Therefore, the same advantages as in the case of the first embodiment can be obtained. For example, the temperatures of the end power generation cells 12a, 12b can be kept equal to the temperature of the power generation cell 12, and improvement in the power generation performance and durability of the end power generation cells 12a, 12b is achieved.

In the second embodiment, the number of grooves of the inlet channel 92a is smaller than the number of grooves of the inlet channel 62a, and the number of grooves of the outlet channel 92b is smaller than the number of grooves of the outlet channel 62b. Alternatively, only the number of grooves of the inlet channel 92a may be smaller than the number of grooves of the inlet channel 62a.

Further, in the end coolant flow field 90, the flow grooves 82 are used, and the number of the flow grooves 82 is smaller than the number of flow grooves 56. Alternatively, in the end coolant flow field 90, the flow grooves 56 may be used. Also in the structure, since the flow rate of the coolant supplied into the end coolant flow field 90 is limited, substantially the same advantages as in the case of the first embodiment can be obtained.

Figure 9:
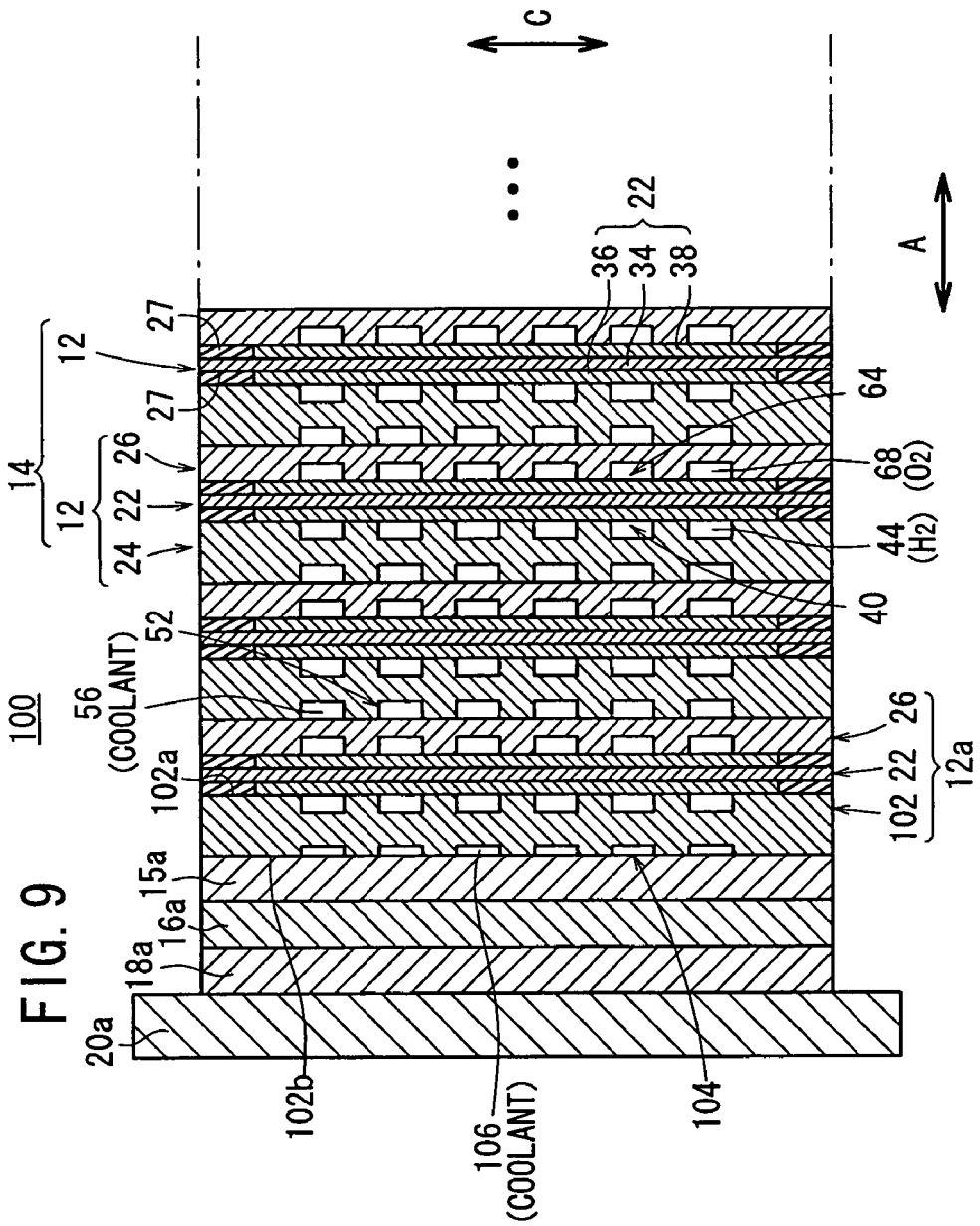
FIG. 9 is a partial cross sectional view showing a fuel cell stack according to a third embodiment of the present invention.
Figure 10:
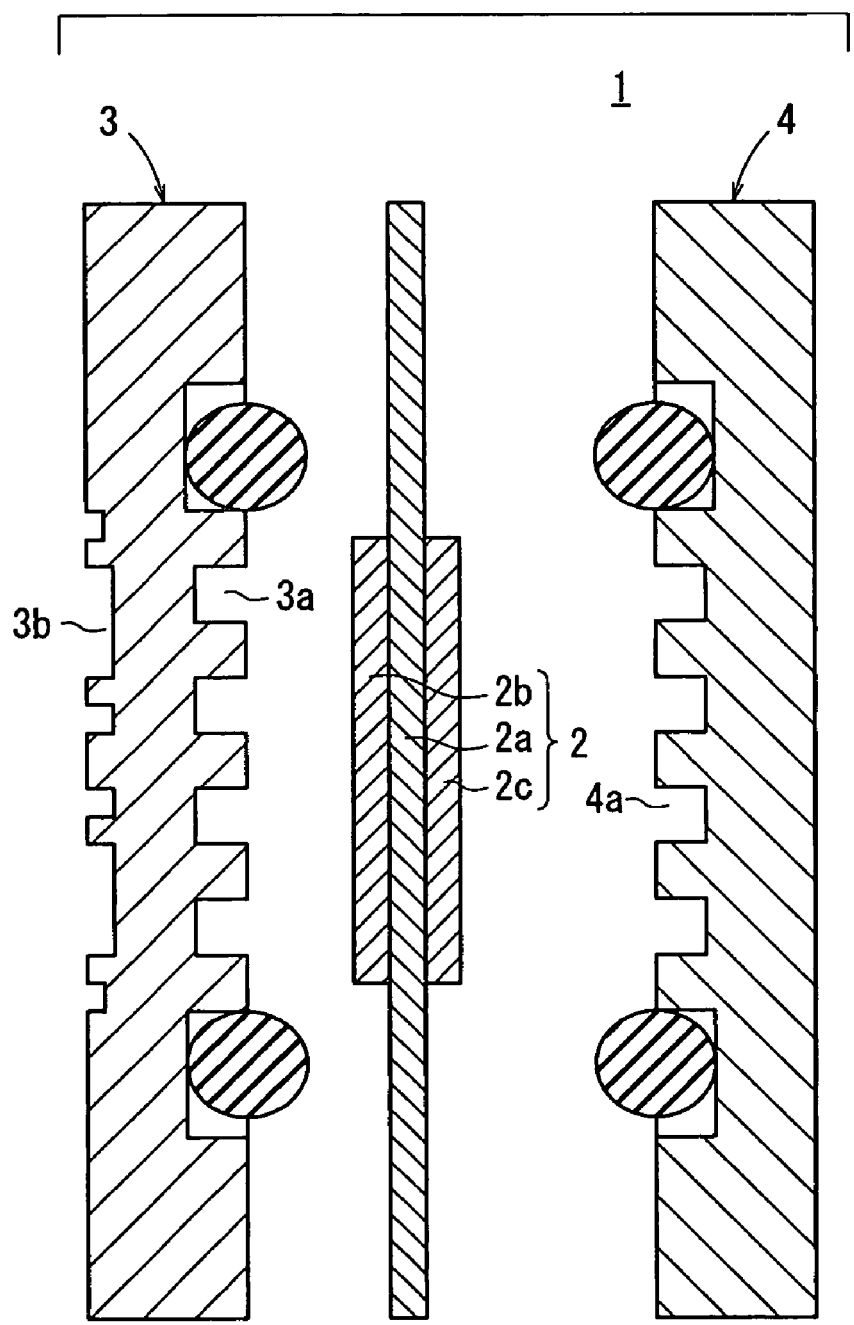
FIG. 10 is a partial cross sectional view showing a conventional polymer electrolyte fuel cell.

FIG. 9 is a partial cross sectional view showing a fuel cell stack 100 according to a third embodiment of the present invention. The constituent elements of the fuel cell stack 10 that are identical to those of the fuel cell stack 100 according to the first embodiment are labeled with the same reference numeral, and detailed description thereof will be omitted.

The end power generation cell 12a of the fuel cell stack 100 has a first separator 102. The first separator 102 has an end coolant flow field 104 on a surface 102b opposite to a surface 102a facing the membrane electrode assembly 22. The end coolant flow field 104 includes a plurality of flow grooves 106, and the number of the flow grooves 106 is the same as the number of the flow grooves 56 of the coolant flow field 52. The depth of the flow grooves 106 is smaller than the depth of the flow grooves 56.

Thus, in the third embodiment, the flow rate of the coolant in the end coolant flow field 104 is smaller than the flow rate of the coolant in the coolant flow field 52, and the same advantages as in the case of the first and second embodiments can be obtained. In the third embodiment, the depth of the flow grooves 106 of the end coolant flow field 104 is determined. Alternatively, or additionally, an inlet channel and/or an outlet channel (not shown) having grooves with a smaller depth in comparison with the grooves of the inlet channel 62a and/or the outlet channel 62b may be employed.

While the invention has been particularly shown and described with reference to preferred embodiments, it will be understood that variations and modifications can be effected thereto by those skilled in the art without departing from the spirit and scope of the invention as defined by the appended claims.

What is claimed is:
1. A fuel cell stack comprising:
a stack body including:

an end power generation cell;
a plurality of first power generation cells; and
a coolant passage extending through the fuel cell stack in a stacking direction, the plurality of first power generation cells being stacked in the stacking direction, and the end power generation cell being provided at a first end of the stack body in the stacking direction,
wherein each first power generation cell comprises:
an electrolyte electrode assembly, said electrolyte electrode assembly including a pair of electrodes and an electrolyte interposed between said electrodes;
separators sandwiching said electrolyte electrode assembly;
a coolant flow field being formed at least at one position between said first power generation cells for allowing a coolant to flow in a direction parallel to a power generation surface; and
a channel connecting said coolant passage through a first buffer to said coolant flow field for supplying the coolant to, or discharging the coolant from said coolant flow field, and
wherein the end power generation cell includes:
an end coolant flow field formed on an outside of said end power generation cell for allowing the coolant to flow in a direction parallel to the power generation surface, where a number of flow grooves in the end coolant flow field of the end power generation cell is the same as a number of flow grooves in the coolant flow field of each first power generation cell, and where the end power generation cell is configured such that the flow rate of the coolant in said end coolant flow field is smaller than the flow rate of the coolant in said coolant flow field of each first power generation cell; and
an end channel connecting said coolant passage through a second buffer to said end coolant flow field for supplying the coolant to, or discharging the coolant from said end coolant flow field where a number of flow grooves of said end channel is smaller than the number of flow grooves of the channel of each first power generation cell.

2. A fuel cell stack according to claim 1 further comprising:
an end separator outside said end power generation cell;
a terminal plate outside said end separator;
an insulating plate outside said terminal plate; and
an end plate outside said insulating plate, where said end coolant flow field is between said end power generation cell and said end separator.

3. A fuel cell stack according to claim 1, wherein a depth of the flow grooves of said end coolant flow field is smaller than a depth of flow grooves of said coolant flow field.

4. A fuel cell stack according to claim 1, wherein a depth of flow grooves of an end channel for supplying the coolant to, or discharging the coolant from said end coolant flow field is smaller than a depth of flow grooves of the channel for supplying the coolant to, or discharging the coolant from said coolant flow field.

5. A fuel cell stack according to claim 1, wherein a depth of flow grooves of said end coolant flow field is smaller than a depth of flow grooves of said coolant flow field; and a depth of flow grooves of an end channel for supplying the coolant to, or discharging the coolant from said end coolant flow field is smaller than a depth of flow grooves of a channel for supplying the coolant to, or discharging the coolant from said coolant flow field.

6. A fuel cell stack according to claim 1 wherein the coolant flow field comprises a plurality of projections that define the flow grooves of the coolant flow field, and
wherein the end coolant flow field comprises a plurality of projections that define the flow grooves of the end coolant flow field.

* * * * *